United States Patent
Watts-Fitzgerald et al.

(10) Patent No.: US 10,460,599 B2
(45) Date of Patent: Oct. 29, 2019

(54) METHOD AND APPARATUS FOR PROVIDING MODEL SELECTION FOR TRAFFIC PREDICTION

(71) Applicant: HERE GLOBAL B.V., Veldhoven (NL)

(72) Inventors: Colin Watts-Fitzgerald, Chicago, IL (US); Michael Weinberger, Geneva, IL (US); Shu Xie, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 694 days.

(21) Appl. No.: 14/681,826

(22) Filed: Apr. 8, 2015

(65) Prior Publication Data

US 2016/0300150 A1 Oct. 13, 2016

(51) Int. Cl.
*G08G 1/01* (2006.01)
*G01C 21/34* (2006.01)

(52) U.S. Cl.
CPC ......... *G08G 1/012* (2013.01); *G01C 21/3492* (2013.01); *G08G 1/0129* (2013.01)

(58) Field of Classification Search
CPC .............. G08G 1/0104; G08G 1/0133; G06F 17/30241
See application file for complete search history.

(56) References Cited

U.S. PATENT DOCUMENTS

| | | | |
|---|---|---|---|
| 2007/0156315 A1* | 7/2007 | Raab | B60T 8/17551 701/38 |
| 2014/0114556 A1* | 4/2014 | Pan | G08G 1/00 701/119 |
| 2014/0222321 A1* | 8/2014 | Petty | G01C 21/3492 701/117 |
| 2014/0236386 A1* | 8/2014 | Yoshizawa | B60W 30/08 701/1 |
| 2015/0212869 A1* | 7/2015 | Chen | G06F 11/0706 714/38.1 |
| 2017/0330055 A1* | 11/2017 | Iwasaki | G06K 9/6262 |

FOREIGN PATENT DOCUMENTS

EP 2610782 A1 * 7/2013 ............. G01C 21/28

OTHER PUBLICATIONS

Smith, B. L., & Demetsky, M. J. (1997). Traffic flow forecasting: comparison of modeling approaches. Journal of transportation engineering, 123(4), 261-266. (Year: 1997).*

Kwoczek, S., Di Martino, S., & Nejdl, W. (2014). Predicting and visualizing traffic congestion in the presence of planned special events. Journal of Visual Languages & Computing, 25(6), 973-980. (Year: 2014).*

* cited by examiner

*Primary Examiner* — Alexey Shmatov
*Assistant Examiner* — Oluwatosin O Alabi
(74) *Attorney, Agent, or Firm* — Ditthavong & Steiner, P.C.

(57) ABSTRACT

An approach is provided for determining one or more real-time traffic data series associated with one or more road segments over one or more time intervals. The approach involves causing, at least in part, a determination of one or more differences of the real-time data series with one or more historical models. The approach also involves determining whether the one or more real-time difference exceeds a threshold difference. The approach involves causing, at least in part, a selection of one or more other historical models for the one or more road segments over the one or more time intervals based, at least in part, on a determination that the real-time difference exceeds the threshold difference.

13 Claims, 14 Drawing Sheets

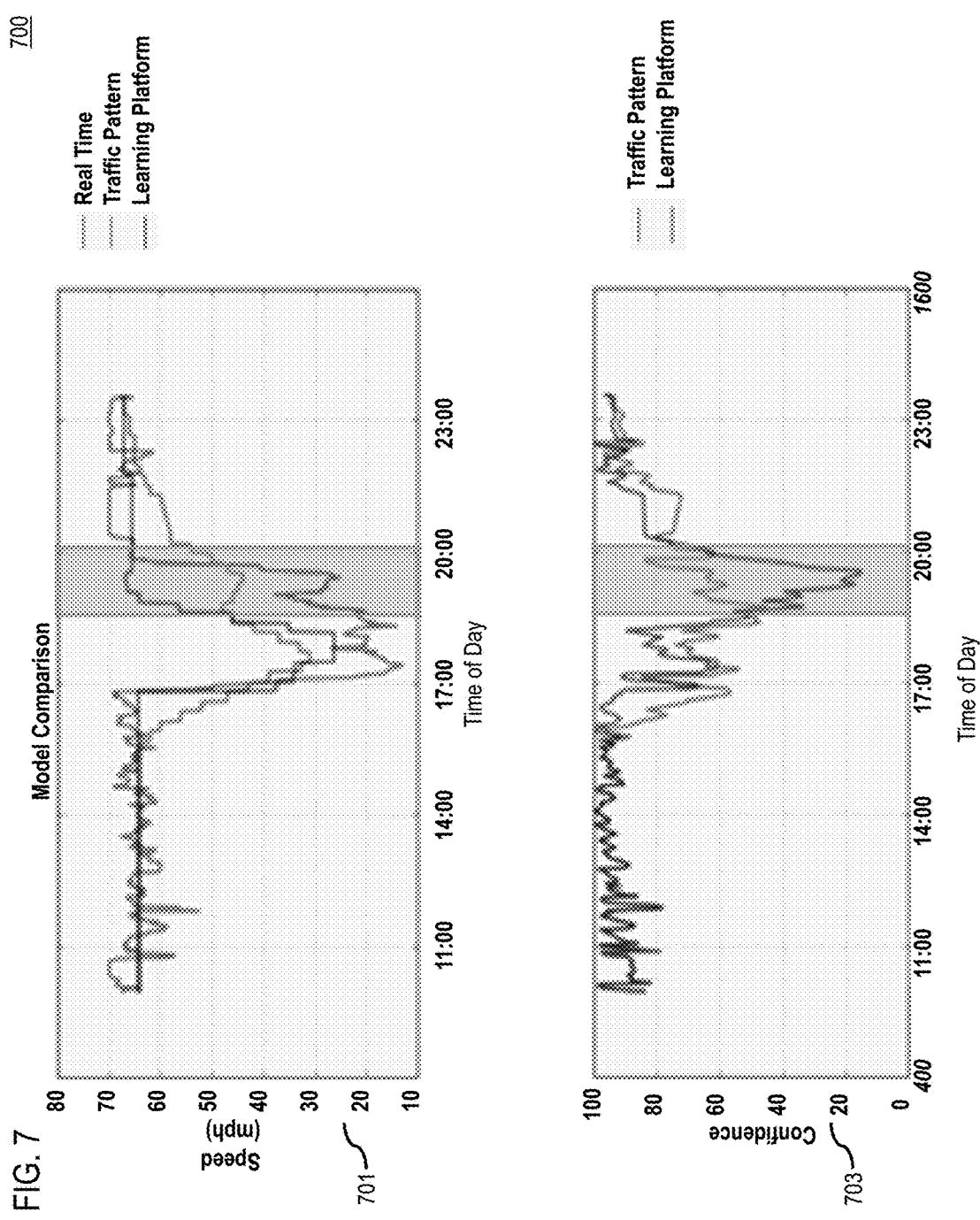

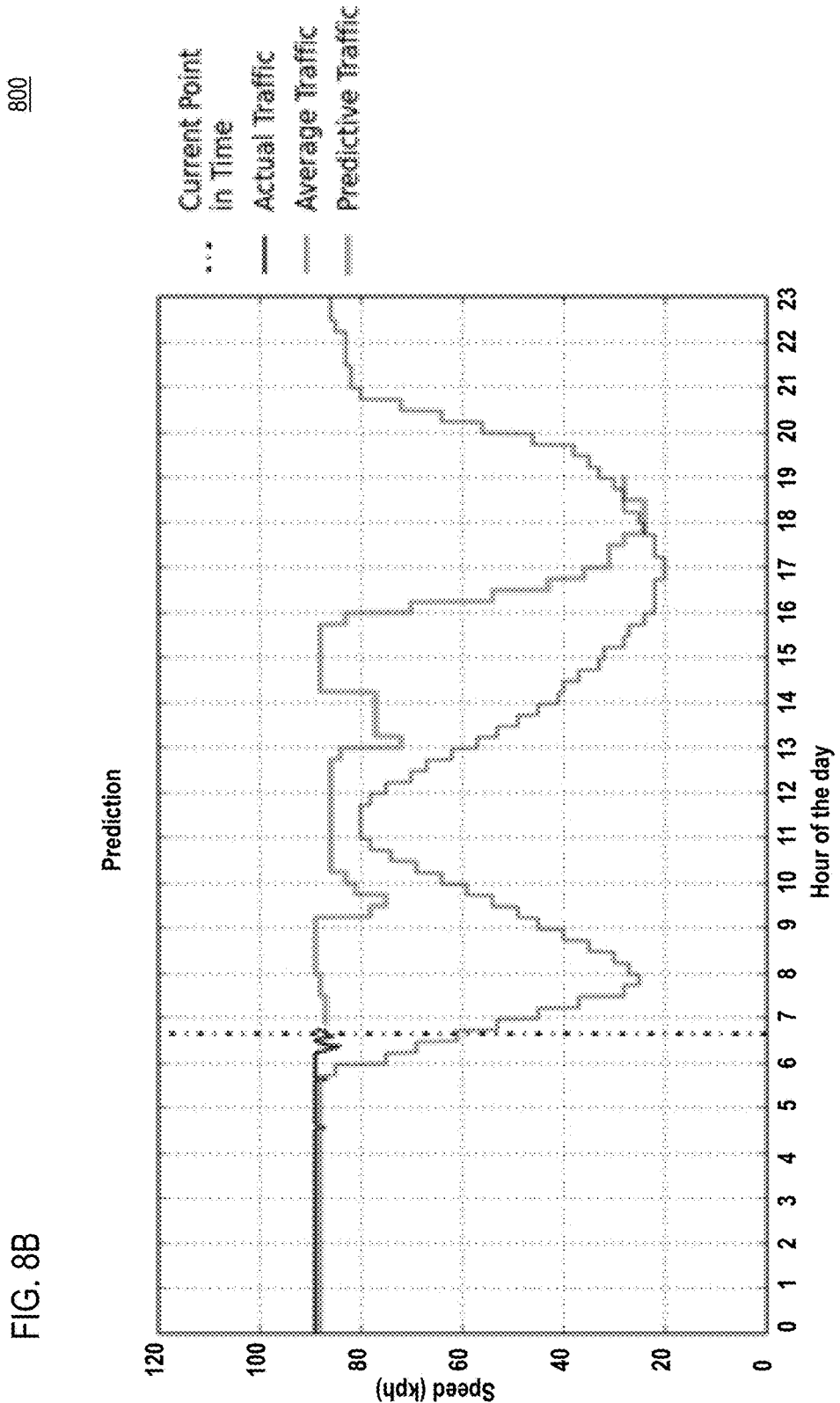

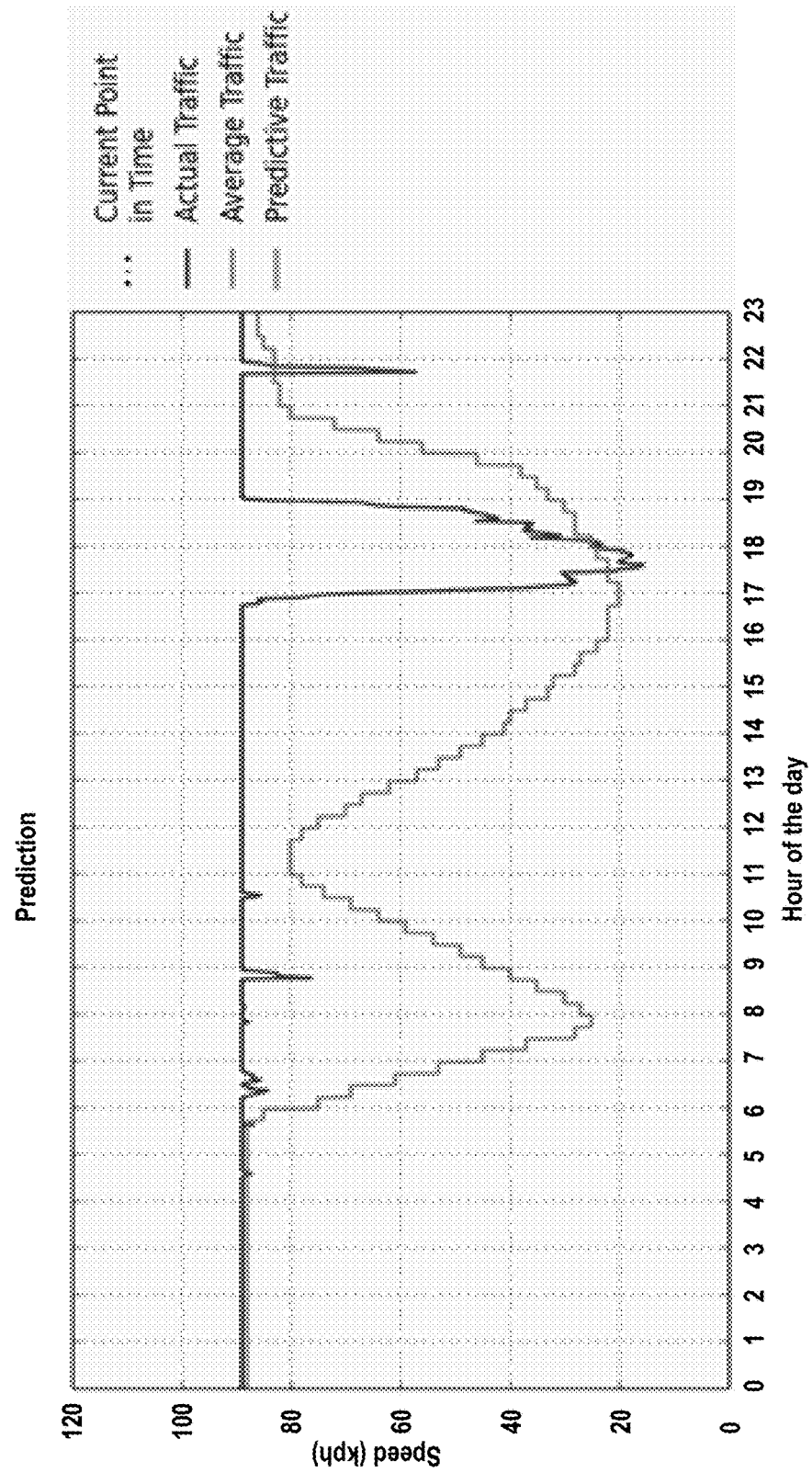

METHOD AND APPARATUS FOR PROVIDING MODEL SELECTION FOR TRAFFIC PREDICTION

BACKGROUND

Service providers and device manufacturers (e.g., wireless, cellular, etc.) are continually challenged to deliver value and convenience to consumers by, for example, providing compelling network services. One area of interest has been the development of predictive traffic applications (e.g. traffic speed, traffic volume, etc.) as a means of conveying real-time information to travelers. However, when displaying mapping and/or navigation information for users, there may be discrepancies between predicted traffic (historical models) and actual traffic. This problem may be particularly acute for users traveling on a road including unconventional traffic patterns, such as may be due to multiple factors that affect traffic (e.g. weather, seasonality, time of day, week, month, etc.) and making traffic prediction adjustments in real-time. Accordingly, service providers and developers face significant technical challenges in adjusting to traffic variability in real-time for predictive models in mapping and/or navigation applications.

SOME EXAMPLE EMBODIMENTS

Therefore, there is a need for an approach for selecting at least one model from plurality of models based, at least in part, on confidence metric for predicting traffic information.

According to another embodiment, an apparatus comprises at least one processor, and at least one memory including computer program code, the at least one memory and the computer program code configured to, with the at least one processor, cause, at least in part, the apparatus to determine at least one first model and at least one second model, wherein the at least one first model and the at least one second model provide for predicting traffic information for one or more travel segments. The apparatus is also caused to determine at least one first confidence metric by evaluating the at least one first model against real-time traffic data associated with the one or more travel segments, wherein the real-time traffic data are collected over a predetermined previous time period. The apparatus is further caused to determine at least one second confidence metric by evaluating the at least one second model against the real-time traffic data. The apparatus is also caused to cause, at least in part, a selection of at least one champion model from among the at least one first model and the at least one second model based, at least in part, on the at least one first confidence metric and the at least one second confidence metric, wherein the least one champion model is used to predict the traffic information for the one or more travel segments based, at least in part, on the selection.

According to another embodiment, a computer-readable storage medium carries one or more sequences of one or more instructions which, when executed by one or more processors, cause, at least in part, an apparatus to determine at least one first model and at least one second model, wherein the at least one first model and the at least one second model provide for predicting traffic information for one or more travel segments. The apparatus is also caused to determine at least one first confidence metric by evaluating the at least one first model against real-time traffic data associated with the one or more travel segments, wherein the real-time traffic data are collected over a predetermined previous time period. The apparatus is further caused to determine at least one second confidence metric by evaluating the at least one second model against the real-time traffic data. The apparatus is also caused to cause, at least in part, a selection of at least one champion model from among the at least one first model and the at least one second model based, at least in part, on the at least one first confidence metric and the at least one second confidence metric, wherein the least one champion model is used to predict the traffic information for the one or more travel segments based, at least in part, on the selection.

According to another embodiment, an apparatus comprises means for determining at least one first model and at least one second model, wherein the at least one first model and the at least one second model provide for predicting traffic information for one or more travel segments. The apparatus also comprises means for determining at least one first confidence metric by evaluating the at least one first model against real-time traffic data associated with the one or more travel segments, wherein the real-time traffic data are collected over a predetermined previous time period. The apparatus further comprises means for determining at least one second confidence metric by evaluating the at least one second model against the real-time traffic data. The apparatus also comprises means for causing, at least in part, a selection of at least one champion model from among the at least one first model and the at least one second model based, at least in part, on the at least one first confidence metric and the at least one second confidence metric, wherein the least one champion model is used to predict the traffic information for the one or more travel segments based, at least in part, on the selection.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 7 includes two diagrams for a comparison of historical models utilized in the processes of FIGS. 3-6, according to various embodiments;

FIG. 9 is a diagram of actual traffic in a real archive to derive traffic statistics for predictive traffic used in the processes of FIGS. 3-6, according to various embodiments;

DESCRIPTION OF SOME EMBODIMENTS

Examples of a method, apparatus, and computer program for selecting at least one model from plurality of models based, at least in part, on confidence metric for predicting traffic information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to determining a model selection using historical models, it is contemplated that a variety of data sources could be used for one or more historical models or to supplement the historical models including crowd source data, network information, public databases, public information (public transport schedules, etc.), and other like information. These data sources may be augmented with information related to particular roads, points-of-interest, geographic locations, city information (e.g. construction, permits) and the like. Also, it may include information related to factors (increasing/mitigating factors etc.) of contributing to road congestion that effect a traffic flow for one or more road segments of interest.

Although various embodiments are described with respect to determining real-time data, it is contemplated that a variety of data sources could be used as real-time data or to supplement the real-time data including crowd source data, network information, public databases, public information (public transport schedules, etc.), and other like information. These data sources may be augmented with information related to particular roads, points-of-interest, geographic locations, city information (e.g. construction, permits) and the like. Also, it may include information related to factors (increasing/mitigating factors etc.) of contributing to road congestion that effect a traffic flow for one or more road segments of interest.

Figure 1A:
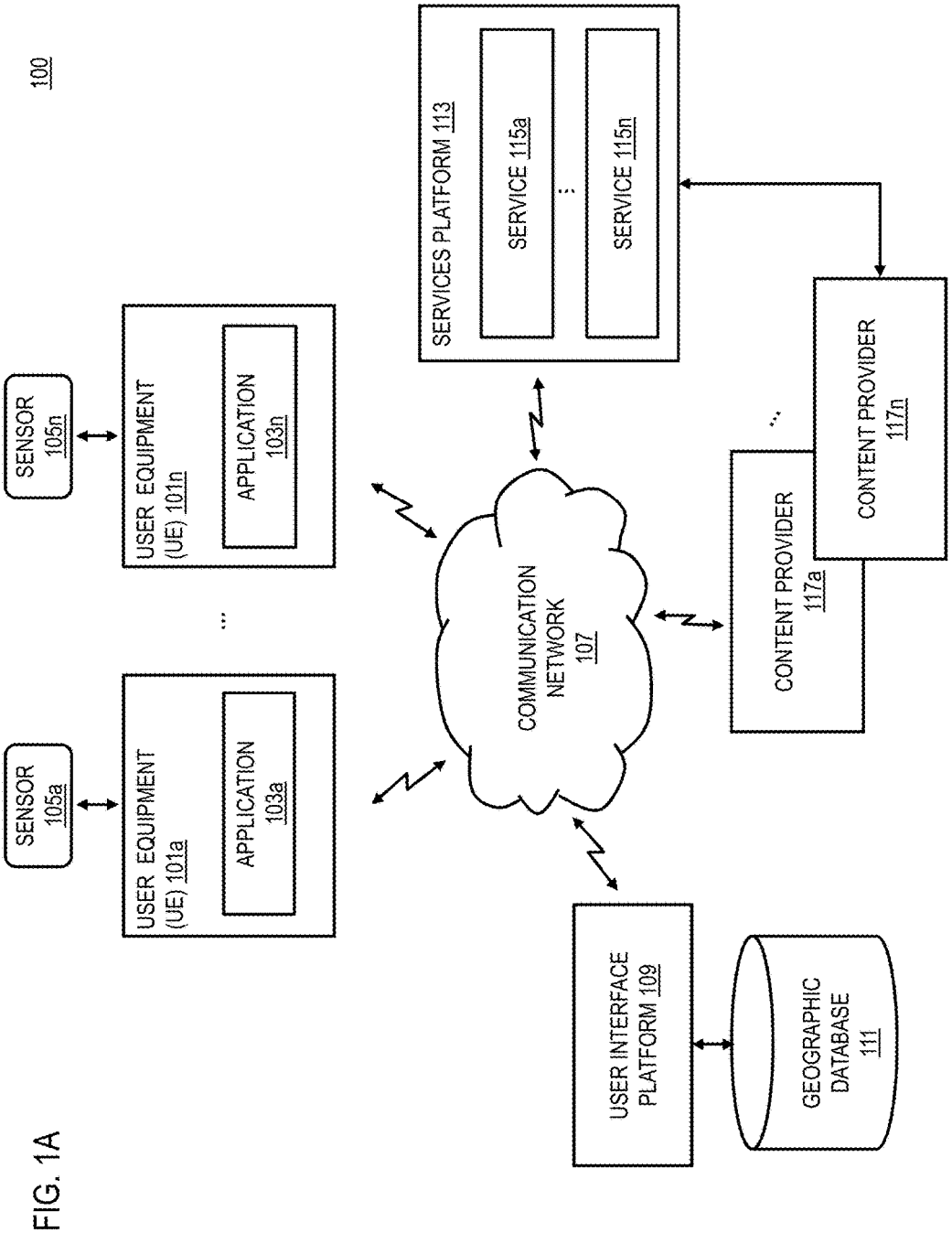
FIG. 1A is a diagram of a system capable of selecting at least one model from plurality of models based, at least in part, on confidence metric for predicting traffic information, according to one embodiment.

FIG. 1A is a diagram of a system capable of selecting at least one model from plurality of models based, at least in part, on confidence metric for predicting traffic information, according to one embodiment. As noted above, the determination of traffic predictions may be difficult due to unanticipated traffic patterns due to road conditions or other unanticipated features affecting traffic. This causes traffic predictions to be problematic and/or inaccurate in such circumstances. This means that navigation or mapping services may provide very limited or inaccurate predictions for many roadways. Furthermore, individual roads may vary in pattern (daily, weekly, yearly, etc.) from one to another due to particular circumstances of the individual roads (commute times, work schedules, yearly work patterns, etc.). Additionally, these individual roads may experience traffic conditions that are not able to be anticipated by only one or a few models. Even individual models that capture copious traffic data for a daily, weekly, monthly, or yearly schedule may often be inaccurate due to such unanticipated conditions. Such unforeseeable events may include weather related events, accidents, road construction, special events (festivals, concerts, etc.), or other like occasions that may disrupt "typical" patterns. One way of coping with these shortcomings is to provide appropriate algorithms for selecting an accurate historical model. Such algorithms may include one or more techniques for a selection of a historical model based on an error analysis that includes comparison with real-time data. Thus, for unforeseen conditions, a model may be chosen and/or updated in real-time which more accurately predict conditions than a default generic model for the day (time of day, week, etc.).

Moreover, problems with traffic predictability are associated with congestion for one or more road segments. This traffic congestion may be less predictable in some road segments, which may make predictions for individual roads inaccurate or unreliable. Thus, a model that only anticipates congestion for the "typical" day may be inaccurate when congestion abates for that time, such as may be the case for unanticipated circumstances including a "rush hour" that does not occur. In fact, congestion traffic makes up the majority of the variance in speeds of roadways, thus identifying when congestion begins or ends for each road segment in real-time is essential to making accurate predictions. Furthermore, these periods of the day are of high priority to customers using map applications for routing estimations. In addition, congestion information may be used in conjunction with other traffic information. Thus, along with traffic congestion, as described, a large portion of roads have unique traffic profiles and differences in the timing and extent of speed variation. Recently, however, these profile differences have been incorporated into traffic prediction related algorithmic programs that can adjust to real-time conditions based on the use of real-time information and appropriate historical models.

To address this problem, a system 100 of FIG. 1 introduces a new method of selecting at least one model from plurality of models based, at least in part, on confidence metric for predicting traffic information. In one embodiment, the system 100 determines at least two models including a default model, which predicts traffic information for an "expected day", and one or more other historical models based on historical information. In one scenario, these historical models are individually compared with real-time traffic data to determine a confidence metric for each (first confidence metric, second . . . etc.). In one scenario, this confidence metric may include an error determination between each historical model and the real-time information. In one scenario, the error determination may be done by taking a combination of error metric comparisons and other inputs for each of the historical models as compared with the real-time data. In one embodiment, the system 100 may by then assessing the confidence metrics for each, cause a selection of at least one champion model based on the error determinations. In one scenario, this champion model may then be used to predict traffic information for one or more travel segments based on the selection for a determined time period.

As an example use case, the system 100 may include a model selection based on a real-time algorithm solution that can choose the best model for the current traffic condition. It may consist of three main steps: 1. Model Selection based upon the confidence score. 2. Reversion to default model. 3. Cliff protection (will be discussed in further embodiments). In one scenario, the system 100 may determine the models to be fed into the confidence calculation are (one example as follows): 1. Default historical model for that day. 2. The noncongestion model. In one embodiment, the system 100 may include a model selection based on the confidence score. As a first step, the system 100 may include a predetermined amount of real-time data that is collected, which is then compared with each model. In one scenario, the system 100 assesses the confidence calculations of the real-time data and the historical model. These data are analyzed using a formula designed to create a confidence score for each historical model. FIG. 7 is an example of the confidence metric for two historical models, traffic patterns and learning platform (names for different historical models used by HERE). During highlighted time range (x-axis), the Traffic Pattern model is the current champion model since it has a much higher confidence value than the other historical model. This is shown in FIG. 7.

In one embodiment, the system 100 may cause a prediction of the traffic information for the one or more travel segments by decaying the at least one champion model from the real-time traffic data. In other words, decaying real-time information to the champion model (historical traffic data) using the varying (targeted) decay rates for the respective road segments. In one embodiment, the system 100 determines a decay rate for a particular road segment for a determined length of time. This decay begins with 100% real-time information and 0% historic information, and then progressively moves to the inverse (100% historic, 0% real-time). In addition, the decay rate (real-time to historic) may be tailored to each particular road segment. The system 100 can use decay functions, which include both real-time and historical (champion/default model) data, such that real-time data is decayed in inverse proportion to an increasing proportion of historic data. Thus, a statistical function using these elements can provide a more nuanced and accurate determination of the traffic flow.

In one embodiment, the system 100 may use the first model as the default model. In one embodiment, the default model is extracted from the historical information as the expected behavior for the travel segment for a particular time. In one scenario, the system 100 may determine the default model from a selection from historical models (constructed from historical information) deemed appropriate for one or more travel segments. In one embodiment, the system 100 may employ the default model until circumstances are such as to determine that the default model is wrong about current traffic conditions. In one scenario, the system 100 may identify if another model outperforms the current model by a targeted margin and subsequently switch to the other model deemed more accurate over a predetermined period of time. In one scenario, this process happens for every road to seek to identify if another model outperforms the default model. In one embodiment, the system 100 may determine the default model as a previous champion model. In other words, the system 100, as described, may select from a multitude of historical models based on a comparison using one or more error assessments, to determine a champion for a particular travel segment over a period of time. Thus, the system 100 may further designate the champion model as a default (standard), against which other historical models are measured.

In one embodiment, the system 100 may cause a selection of at least one second model as the champion model if the second confidence metric is greater than the first confidence metric by at least one threshold value. In other words, the system 100 may compare the error assessments for the first (default) model and one or more other (second) models.

These error assessments may be used to calculate a confidence metric in which a higher confidence is assigned to the historical model deemed to have lower error factors. Furthermore, as a safety factor, the system 100 may include a threshold by which the one or more second models must exceed the confidence metric of the first model. Thereby, the system 100 may prevent a frequent switching between historical models than may make the predictions idiosyncratic and thus unreliable. In one embodiment, the system 100 may include the default model as a noncongestion model. The default model, therefore, may be chosen for a period of low congestion (high variance model) for a given travel segment for a time period.

In one embodiment, the system 100 may include one or more situations in which the champion model is not the default model. In one scenario, the system 100 may cause a reversion of the at least one champion model to the default model over subsequent epochs for predicting traffic information. Thus, in one scenario, the system 100 may choose a historical model that includes a higher confidence metric than other competing historical models (including the default model). In one scenario, since the champion model is not the default model, the system 100 may protect against sudden errors being introduced by following this champion model that is not the default for a period before gradually returning to the default. Therefore, after a period of total reliance on the champion model, the system 100 may gradually substitute the default historical model for the champion model. Thus, in one embodiment, the system 100 may cause a transitioning of the at least one champion model to the at least one default model. In one scenario, the system 100 may reintroduce the default model by weighting each portion of the transitioning epoch by a decreasing and increasing amount of the champion and default models, respectively.

As an example use case in this embodiment, if the system 100 picks the noncongestion model (or any non-default historical model in the future), it is used for a period of epochs for prediction, wherein each epoch is a metric of time. Subsequently, the next series of epochs include a slow reversion/decay to the default historical model. And, finally, the model is entirely the original historical model. In one scenario, over the transition epochs, a weighted combination of the two models is formed. Thus, the new model to be phased-in, including a decaying of the real-time data in 3 parts: a period of epochs of non-default champion model, a period of epochs of transition model, and then fully transitioning to the default historical model.

In one embodiment, the system 100 may determine that one or more future time periods (epochs) have been designated as one or more congestion periods, and, thus, cause a restriction in which a selection may be among one or more congestion-based models. Thereafter, the selected model may be used to predict traffic information for the epoch chosen for congestion behavior. In one embodiment, the system 100 may restrict the selection of the champion model to one or more default models for predicting traffic information over the future epochs. In one scenario, this aforementioned restriction is another method of preventing an inadvertent mismatch due to the champion model being chosen from prior epochs, which may be less accurate as the real-time information is processed or as unanticipated events may occur. In one embodiment, the system 100 may update a selection of the at least one champion model—periodically, continuously, on demand, or a combination thereof. In one scenario, the system 100 may enable a user to process an update via these options (periodically, continuously, on-demand etc.) to improve performance or conform to user requirements/preferences.

As an example use case, the system 100 may employ cliff protection, which includes a reliance on a congestion-based model or default model at the beginning of a period deemed congestion-based only. In one scenario, the system 100 protects the model selection from selecting a noncongestion model when congestion periods such as rush hour are only slightly later than usual. In one scenario, the system 100, when it is late into a congestion period, such as during a rush hour that is delayed, there may be a high possibility that a noncongestion model will be selected, which will give very large errors as real-time speed does drop in speed (with the start of a delayed rush hour). Thus, to prevent this, only the default historical model is allowed to be used at the beginning of these periods of time. In one scenario, the system 100 may include a list of epochs during the day that the noncongestion model may not be picked. Such periods may be: (inclusive) 6 am to 10 am and 4 pm to 7 pm for the day starting at 6 am when broken down into increments. So, during these epochs the default historical model will always be used.

As shown in FIG. 1A, the system 100 comprises user equipment (UE) 101*a*-101*n* (collectively referred to as UE 101) that may include or be associated with applications 103*a*-103*n* (collectively referred to as applications 103) and sensors 105*a*-105*n* (collectively referred to as sensors 105). In one embodiment, the UE 101 has connectivity to the user interface platform 109 via the communication network 107. In one embodiment, the user interface platform 109 performs the functions associated with a processing of probe trace data to determine one or more modes of transport.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 103 may be any type of application that is executable at the UE 101, such as content provisioning services, location-based service applications, navigation applications, camera/imaging application, media player applications, social networking applications, calendar applications, and the like. In one embodiment, one of the applications 103 at the UE 101 may act as a client for the user interface platform 109 and perform one or more functions of the user interface platform 109. In one scenario, users are able select the particular mode of transport for identification via one or more map applications. In one embodiment, one or more receivers of the UE 101 may process status information associated with one or more points of interest to determine point-of-interest changes and may present point-of-interest representations in a point-of-interest user interface.

By way of example, the sensors 105 may be any type of sensor. In certain embodiments, the sensors 105 may include, for example, a camera/imaging sensor for gathering image data, an audio recorder for gathering audio data, a global positioning sensor for gathering location data, a network detection sensor for detecting wireless signals or network data, temporal information and the like. In one scenario, the sensors 105 may include location sensors (e.g., GPS), light sensors, oriental sensors augmented with height sensor and acceleration sensor, tilt sensors, moisture sensors, pressure sensors, audio sensors (e.g., microphone), or receivers for different short-range communications (e.g., Bluetooth, Wi-Fi, etc.). In one scenario, the one or more sensors 105 may detect attributes for one or more modes of transportation. In another scenario, the one or more UE 101 may have sensors tuned to detect characteristic aggregates of one or more modes of transport, whereby the sensor data may be calculated either on the cloud or by the UE 101

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

The services platform 113 may include any type of service. By way of example, the services platform 113 may include content (e.g., audio, video, images, etc.) provisioning services, application services, storage services, contextual information determination services, location based services, social networking services, information (e.g., weather, news, etc.) based services, etc. In one embodiment, the services platform 113 may interact with the UE 101, the 3D user interface platform 109 and the content provider 117a-117n (hereinafter content provider 117) to supplement or aid in the processing of the content information.

By way of example, services 115a-115n (hereinafter services 115) may be an online service that reflects interests and/or activities of users. In one scenario, the services 115 provide representations of each user (e.g., a profile), his/her social links, and a variety of additional information. The services 115 allow users to share media information, location information, activities information, contextual information, and interests within their individual networks, and provides for data portability.

The content provider 117 may provide content to the UE 101, the user interface platform 109, and the services 115 of the services platform 113. The content provided may be any type of content, such as image content, video content, audio content, textual content, etc. In one embodiment, the content provider 117 may provide content that may supplement content of the applications 103, the sensors 105, the geographic database 111 or a combination thereof. By way of example, the content provider 117 may provide content that may aid in causing a generation of at least one request to capture at least one content presentation. In one embodiment, the content provider 117 may also store content associated with the UE 101, the user interface platform 109, and the services 115 of the services platform 113. In another embodiment, the content provider 117 may manage access to a central repository of data, and offer a consistent, standard interface to data, such as a repository of users' navigational data content.

Figure 1B:
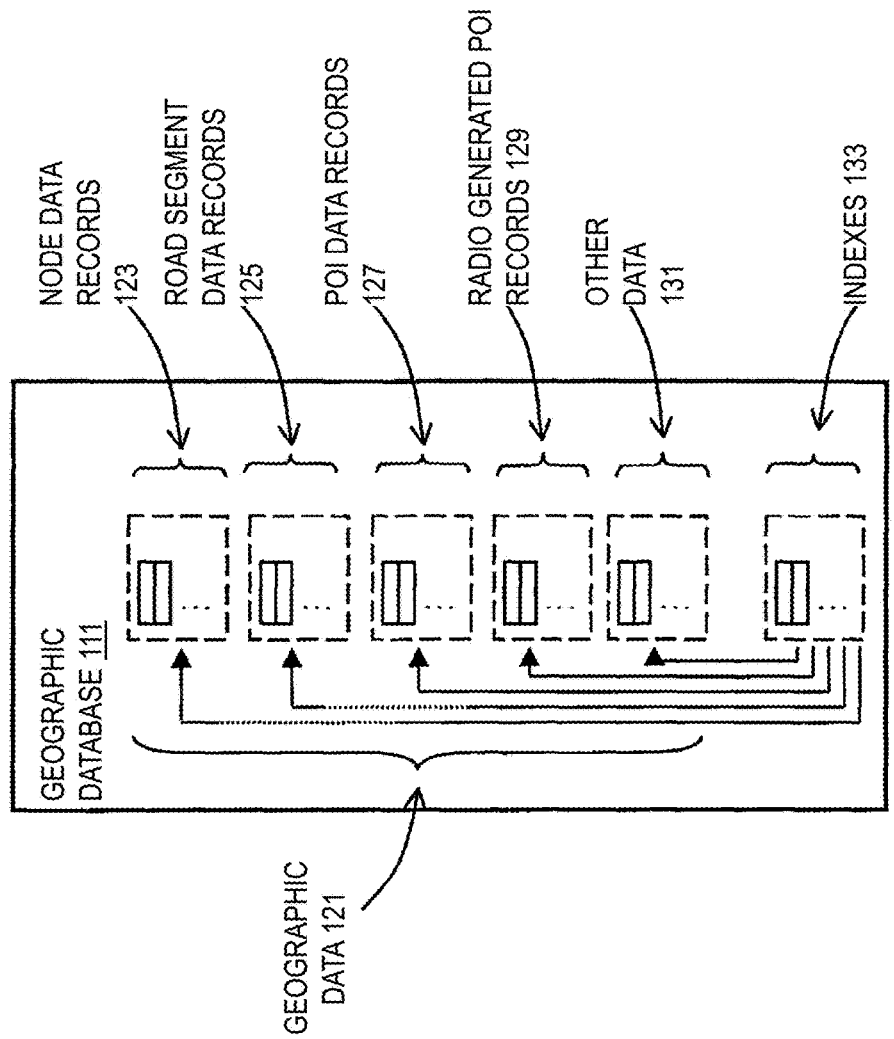
FIG. 1B is a diagram of the components of a geographic database 111, according to one embodiment.

For example, as shown in FIG. 1B, the geographic database 111 includes node data records 123, road segment or link data records 125, POI data records 127, and other data records 131. More, fewer or different data records can be provided. In one embodiment, the other data records 131 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 125 are links or segments representing roads, streets, or paths, as can be used in the calculated route or recorded route information for selecting at least one model from plurality of models based, at least in part, on confidence metric for predicting traffic information. The node data records 123 are end points corresponding to the respective links or segments of the road segment data records 125. The road link data records 125 and the node data records 123 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 127. The geographic database 111 can also include data about places, such as cities, towns, or other communities, and other geographic features, such as bodies of water, mountain ranges, etc. Such place or feature data can be part of the POI data 127 or can be associated with POI data records 127 (such as a data point used for displaying or representing a position of a city). In addition, the geographic database 111 can include and/or be associated with event data (e.g., traffic incidents, constructions, scheduled events, unscheduled events, etc.) associated with the POI data records 147 or other records of the geographic database 111.

The geographic database 111 can be maintained by the content provider (e.g., a map developer) in association with the services platform 113. By way of example, the map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the server side geographic database 111 can be a master geographic database, but in alternate embodiments, the client side geographic database 111 can represent a compiled navigation database that can be used in or with end user devices (e.g., UEs 101) to provide navigation and/or map-related functions. For example, the geographic database 111 can be used with the end user device 101 to provide an end user with navigation features. In such a case, the geographic database 111 can be downloaded or stored on the end user device UE 101, such as in applications 103, or the end user device UE 101 can access the geographic database 111 through a wireless or wired connection (such as via a server and/or the communication network 107), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation and map functions such as guidance and map display, for example, and for determination of one or more personalized routes or route segments based on one or more calculated and recorded routes, according to exemplary embodiments.

Figure 2:
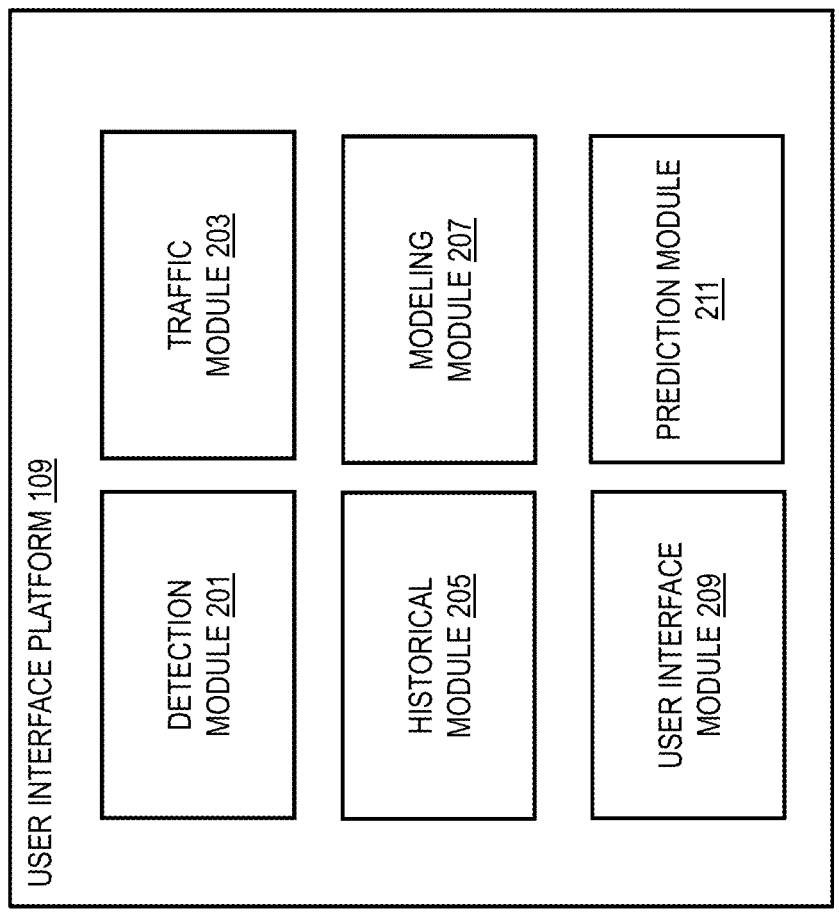
FIG. 2 is a diagram of the components of a user interface platform 109, according to one embodiment.

FIG. 2 is a diagram of the components of a user interface platform 109, according to one embodiment. By way of example, the user interface platform 109 includes one or more components for selecting at least one model from plurality of models based, at least in part, on confidence metric for predicting traffic information. It is contemplated that the functions of these components may be combined in one or more components or performed by other components of equivalent functionality. In one embodiment, the user interface platform 109 includes a detection module 201, a traffic module 203, a historical module 205, a modeling module 207, a user interface module 209, and a prediction module 211.

In one embodiment, the detection module 201 includes system algorithms, sensors 105, network databases, and/or one or more third-party content providers, such as content providers 117 for determining one or more real-time traffic data series associated with one or more road segments over one or more time intervals. The mapping and/or detection data can be preprogrammed into the user interface platform 109, gathered from crowd source data network, or gathered from at least one sensor or device, and processed via the traffic module 203 and historical module 205 to provide a selection of one or more historical models for the one or more road segments over the one or more time intervals. This detection module 201 may be further modified with user preferences and tolerances, which, in part, provide a determination of traffic flow information.

In one embodiment, the traffic module 203 includes an integrated system for a processing of traffic flow data and mapping data including real-time and historical data to determine traffic flow and default model information. Such traffic information can be stored in an on-board systems database, modified manually, accessed when prompted by application 103, or gathered from devices or sensors incorporated into the detection module 201. Such may be processed via the traffic module 203 to provide an output for determining one or more real-time traffic data series associated with one or more road segments over one or more time intervals. The traffic module 203 may also be used to correlate mapping, and other relevant information with the traffic flow data. This traffic information may be further modified with user preferences and tolerances, which, in part, provide selective modifications of the traffic determination system.

In multiple embodiments, the historical module 205 provides traffic flow data that has been accumulated over a relevant time period for one or more road segments. Furthermore, this historical module 205 may incorporate numerous models that may be chosen as predictive for the one or more road segments. The user interface platform 109 may incorporate one or more algorithms for evaluating each of the historical models for predictive accuracy for the one or more road segments. The historical module 205 can be integrated to extract data from multiple sources including: traffic flow data, mapping data, crowd source data, data from networks or databases, weather reports, and real-time information from sensors/detectors via the detection module 201. Furthermore, integration can provide a calculation for the past travel characteristics which may be continually extracted from traffic flow information including information processed via the traffic module 203. It may include an output of a selection of one or more historical models for the one or more road segments over the one or more time intervals.

In multiple embodiments, the modeling module 207 will process the outputted information of the detection module 201, traffic module 203, and historical module 205, respectively. The detection module 201 and traffic module 203 configure the real-time traffic flow data. Therefore, the user interface platform 109 includes a modeling module 207 to evaluate the detection module 201 and the traffic module 203 with the historical module 205 and integrate the information to determine a number of statistical parameters, including traffic flow variance, standard deviation, error assessments for each potential model, other graphical features, and the like. Furthermore, inputted data, algorithms, and process formats may be used to calculate a selection of the one or more historical models/characteristics associated with one or more road segments. This analysis of real-time information and historical traffic flow data, including historical models, may be outputted to the prediction module 211 to determine traffic predictions based on one or more historical models.

In one embodiment, the user interface module 209 may be configured for exchanging information between UE 101 and the geographic database 111, and/or one or more third-party content providers. In another embodiment, the user interface module 209 enables presentation of a graphical user interface (GUI) for displaying predictive traffic information. For example, the user interface module 209 executes a GUI application configured to provide users with a processing of traffic information and a presentation of forecasts (e.g. 12 hr. forecasts). The user interface module 209 employs various application programming interfaces (APIs) or other function calls corresponding to the applications 103 of UE 101, thus enabling the display of graphics primitives such as menus, buttons, data entry fields, etc., for generating the user interface elements. Still further, the user interface module 209 may be configured to operate in connection with augmented reality (AR) processing techniques, wherein various different applications, graphic elements and features may interact. For example, the user interface module 209 may coordinate the presentation of augmented reality map images in conjunction with content information for a given location or in response to a selected point-of-interest representation. In a further embodiment, the user interface module 209 may cause a presentation of traffic flow information as representations, as photographic images, or a combination thereof.

In one embodiment, the prediction module 211 may process the outputs of the modeling module 207 as well as information from other modules to determine a selection of one or more historical models for one or more road segments. For instance, the prediction module 211 may output a statistical model of the predicted traffic flow over the next day, week, month, etc. These predictions may be constructed based on a model selection that itself based upon a confidence score. Furthermore, the prediction module 211 may include an algorithm for reverting to a default model if the current champion model includes an error greater than a threshold for a given time period. Also, the prediction module 211 may include an algorithm for preventing a reversion to a noncongestion model (low variance) for a period designated for congestion (or for part of the period), such as may be the case for a delayed congestion period (rush hour). In one scenario, the prediction module 211 may provide feedback iteratively to the traffic module 203, modeling module 207 or one of the other modules. In another embodiment, the prediction module 211 may cause a presentation of content information in the most suitable manner for a consistent user experience.

Figure 3:
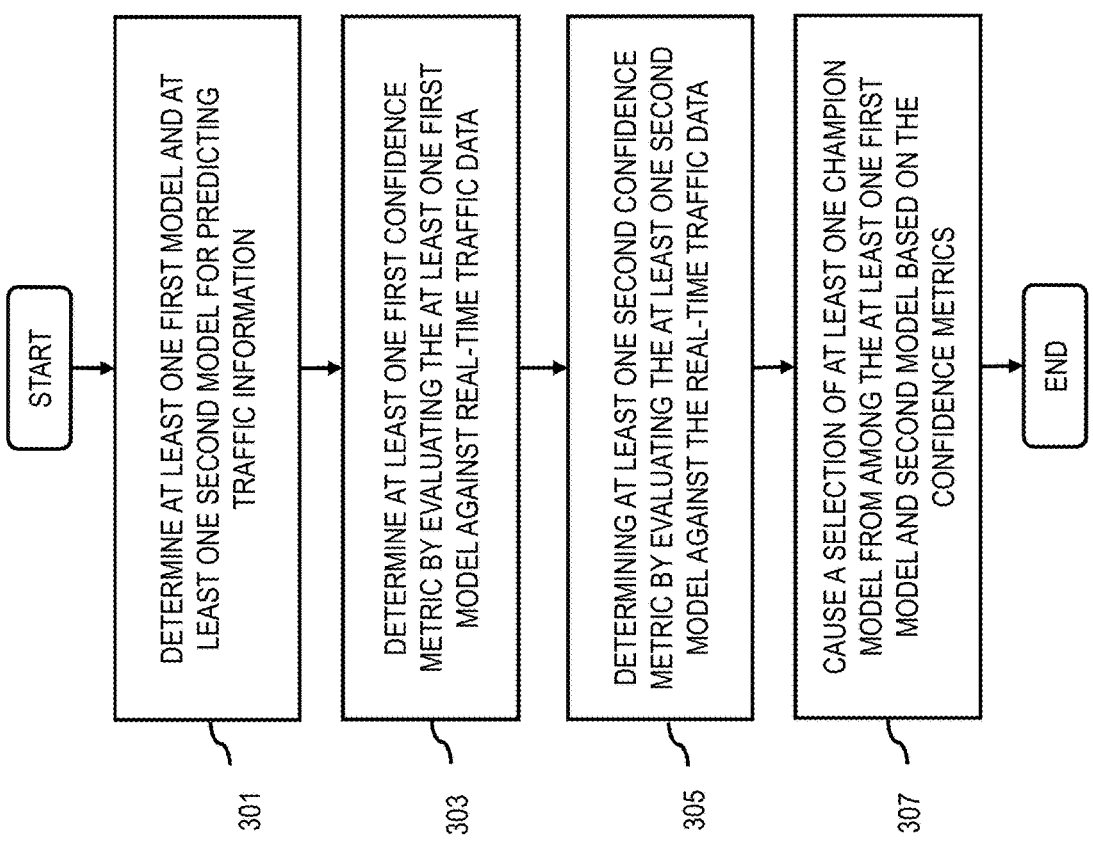
FIG. 3 is a flowchart of a process for selecting at least one model from plurality of models based, at least in part, on confidence metric for predicting traffic information, according to one embodiment.
Figure 11:
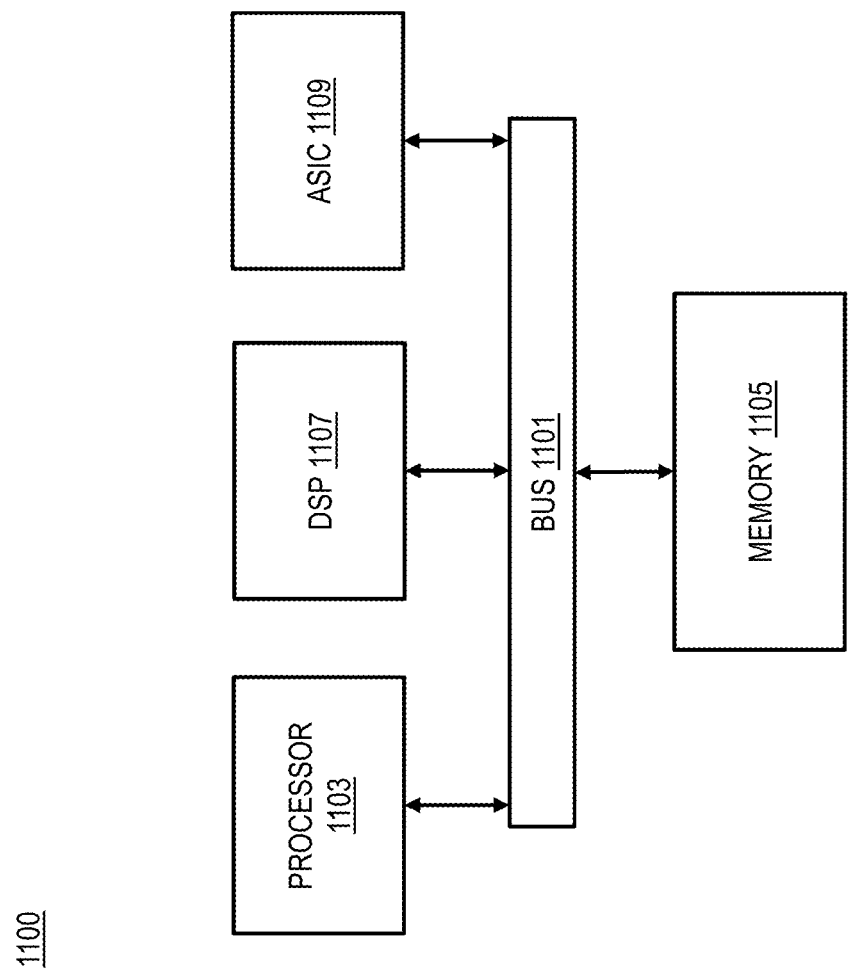
FIG. 11 is a diagram of a chip set that can be used to implement an embodiment of the invention.

FIG. 3 is a flowchart of a process for selecting at least one model from plurality of models based, at least in part, on confidence metric for predicting traffic information, according to one embodiment. In one embodiment, the user interface platform performs the process 300 and is implemented in, for instance, a chip set including a processor and a memory as shown in FIG. 11.

In step 301, the user interface platform 109 may determine a first model and at least one second model. In one embodiment, the system 100 determines at least two models including a default model, which predicts traffic information for an "expected day", and one or more other historical models based on historical information. In one scenario, the at least two models may be considered competing historical models to potentially be used to predict upcoming traffic flow information.

In step 303, the user interface platform 109 may determine at least one first confidence metric by evaluating the at least one first model against real-time traffic data associated with the one or more travel segments, wherein the real-time traffic data via the traffic module 203 are collected over a predetermined previous time period. In one embodiment, the historical models via the historical module 205 including the first model (default or champion model) are individually compared with real-time traffic data to determine a confidence metric for each (first confidence metric, second . . . etc.). In one scenario, this confidence metric may include an error determination between each historical model and the real-time information. In one scenario, the error determination may be done via the prediction module 211 by taking a combination of error metric comparisons and other inputs for each of the historical models as compared with the real-time data.

In step 305, the user interface platform 109 may determine at least one second confidence metric by evaluating the at least one second model against real-time traffic data associated with the one or more travel segments, wherein the real-time traffic data are collected over a predetermined previous time period. In one embodiment, the historical models including the second model (competing historical model) are individually compared with real-time traffic data to determine a confidence metric for each (first confidence metric, second . . . etc.). In one scenario, this confidence metric may include an error determination between each historical model and the real-time information. In one scenario, the error determination may be done via the prediction module 211 by taking a combination of error metric comparisons and other inputs for each of the historical models as compared with the real-time data.

In step 307, the user interface platform 109 may cause, at least in part, a selection of at least one champion model from among the at least one first model and the at least one second model based, at least in part, on the at least one first confidence metric and the at least one second confidence metric. In one embodiment, the user interface platform 109 may include the least one champion model to predict the traffic information for the one or more travel segments based, at least in part, on the selection. In one embodiment, the system 100 may by then assessing the confidence metrics for each, cause a selection of at least one champion model based on the error determinations. In one scenario, this champion model may then be used to predict traffic information for one or more travel segments based on the selection for a determined time period. As an example, such a comparison between competing historical models may be seen in FIG. 7.

Figure 4:
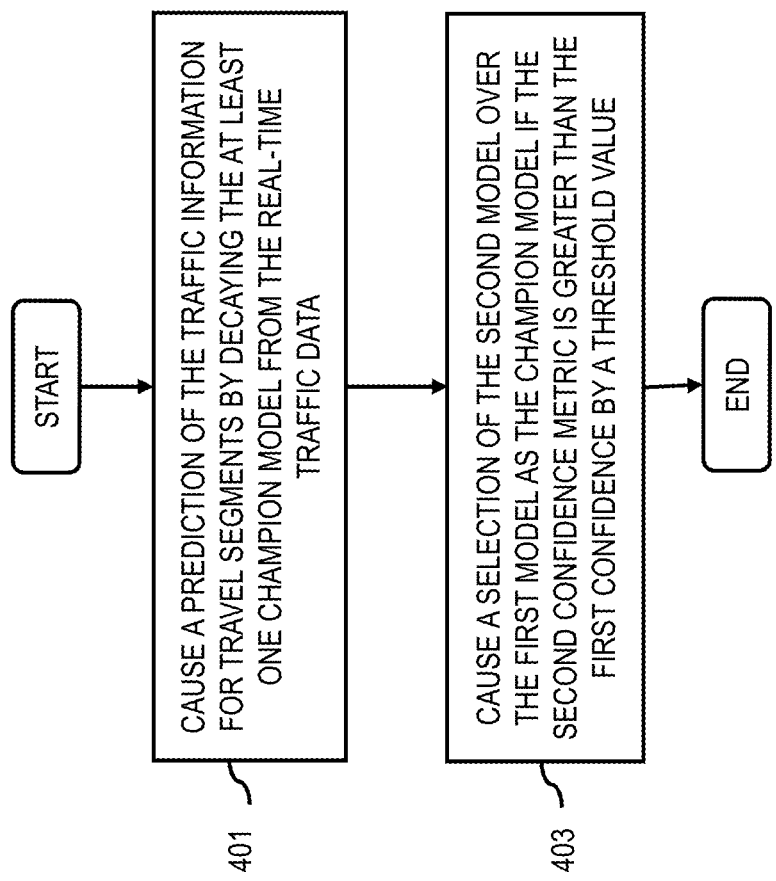
FIG. 4 is a flowchart of a process for causing a prediction of the traffic information for the one or more travel segments by decaying the at least one champion model from the real-time traffic data, then causing a selection of the second model over the first model as the at least one champion model if the second confidence metric is greater than the first confidence by a threshold value, according to one embodiment.

FIG. 4 is a flowchart of a process for causing a prediction of the traffic information for the one or more travel segments by decaying the at least one champion model from the real-time traffic data, then causing a selection of the second model over the first model as the at least one champion model if the second confidence metric is greater than the first confidence by a threshold value, according to one embodiment. In one embodiment, the user interface platform performs the process 400 and is implemented in, for instance, a chip set including a processor and a memory as shown in FIG. 11.

In step 401, the user interface platform 109 may cause a prediction of the traffic information for the one or more travel segments by decaying the at least one champion model from the real-time traffic data. In one embodiment, the user interface platform 109 may decay real-time information to the current champion model (historical traffic data) using one or more varying (targeted) decay rates for the respective road segments. In one embodiment, the user interface platform 109 may determine a decay rate for a particular road segment for a determined length of time. This decay begins with 100% real-time information and 0% champion/default model information (historic information), and then progressively moves to the inverse (100% champion, 0% real-time). In addition, the decay rate (real-time to champion) may be tailored to each particular road segment. For example, the decay rate may plummet and rely more on the historical model for a travel segment deemed high variance, but conversely rely on a greater proportion of real-time data for low variance travel segments. Thus, the user interface platform 109 may use decay functions, which include both real-time and historical (champion/default model) data, such that real-time data is decayed in inverse proportion to an increasing proportion of historical data. Thus, a statistical function using these elements can provide a more nuanced and accurate determination of the traffic flow.

In step 403, the user interface platform 109 may cause a selection of the second model over the first model as the champion model if the second confidence metric is greater than the first confidence by a threshold value. In one embodiment, the user interface platform 109 may use the first model as the default model for comparison with one or more second models, which are used as competitors with the default model. In multiple embodiments, the default model is extracted from the historical information as the expected behavior for the travel segment for a particular time. In one scenario, the system 100 may determine the default model from a selection from historical models (constructed from historical information) deemed appropriate for one or more travel segments.

In one embodiment, the user interface platform 109 may employ the default model until circumstances are such as to determine that the default model is wrong about current traffic conditions. In one scenario, the user interface platform 109 may identify if another model outperforms the current model by a targeted margin and subsequently switch to the other model deemed more accurate over a previous designated time period. In one scenario, this process happens for every road to seek to identify if another model outperforms the default model. In one embodiment the user interface platform 109 may determine the default model as a previous champion model. In other words, the user interface platform 109 as described, may select from a multitude of historical models based on a comparison using one or more error assessments via the historical module 205 and modeling module 207, to determine a champion for a particular travel segment over a period of time. Thus, the user interface platform 109 may further designate the champion model as a default (standard), against which other historical models are measured.

Furthermore, in step 403, the user interface platform 109 may cause a selection of at least one second model as the champion model if the second confidence metric is greater than the first confidence metric by at least one threshold value. In other words, the user interface platform 109 may compare the error assessments for the first (default) model and one or more other (second) models. In one scenario, these error assessments may be used to calculate a confidence metric in which a higher confidence is assigned to the historical model deemed to have lower error factors. In one embodiment, furthermore, as a safety factor, the user interface platform 109 may include a threshold by which the one or more second models must exceed the confidence metric of the first model. Thereby, the system 100 may prevent a frequent switching between historical models than may make the predictions idiosyncratic and thus unreliable. In one embodiment, the user interface platform 109 may include the default model as a noncongestion model. The default model, therefore, may be chosen for a period of low congestion (high variance model) for a given travel segment for a time period.

Figure 5:
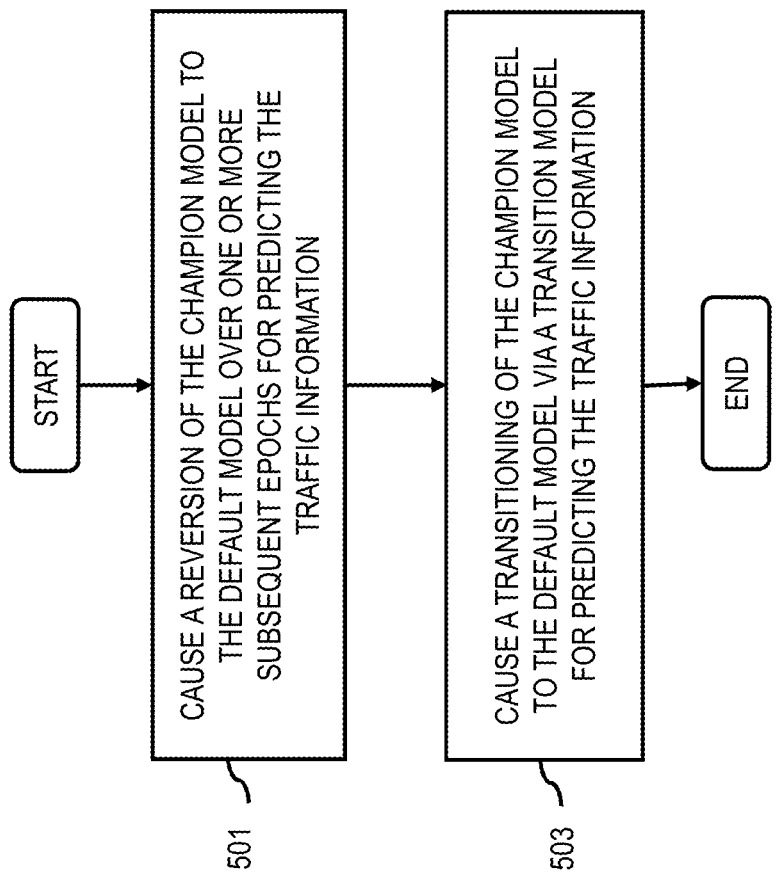
FIG. 5 is a flowchart of a process for causing a reversion of the champion model to the default model over one or more subsequent epochs, and including a transitioning model for the reversion as a means for predicting the traffic information, according to one embodiment.

FIG. 5 is a flowchart of a process for causing a reversion of the champion model to the default model over one or more subsequent epochs, and including a transitioning model for the reversion as a means for predicting the traffic information, according to one embodiment. In one embodiment, the user interface platform performs the process 500 and is implemented in, for instance, a chip set including a processor and a memory as shown in FIG. 11.

In step 501, the user interface platform 109 may include one or more situations in which the champion model is not the default model. In one embodiment, the user interface platform 109 may cause a reversion of the at least one champion model to the default model over subsequent epochs (time periods) for predicting traffic information. Thus, in one scenario, the user interface platform 109 may choose a historical model that includes a higher confidence metric than other competing historical models (including the default model). In one scenario, since the champion model is not the default model, the user interface platform 109 may protect against sudden errors being introduced in the predictions by following this champion model that is not the default for a period before gradually returning to the default. Therefore, in one scenario, after a period of total reliance on the champion model, the user interface platform 109 may gradually substitute the default historical model for the champion model.

In step 503, the user interface platform 109 may cause a transitioning of the champion model to at least one default model via at least one transition model for predicting the traffic information. In one embodiment, the user interface platform 109 may cause a transitioning of the at least one champion model to the at least one default model. In one scenario, the user interface platform 109 may reintroduce the default model by weighting each portion of the transitioning epoch by a decreasing and increasing amount of the champion and default models, respectively. In one embodiment, the user interface platform 109 may include such a transition to exclude one or more possibilities of the champion model causing inaccurate predictions by having less relevance for later time epochs.

Figure 6:
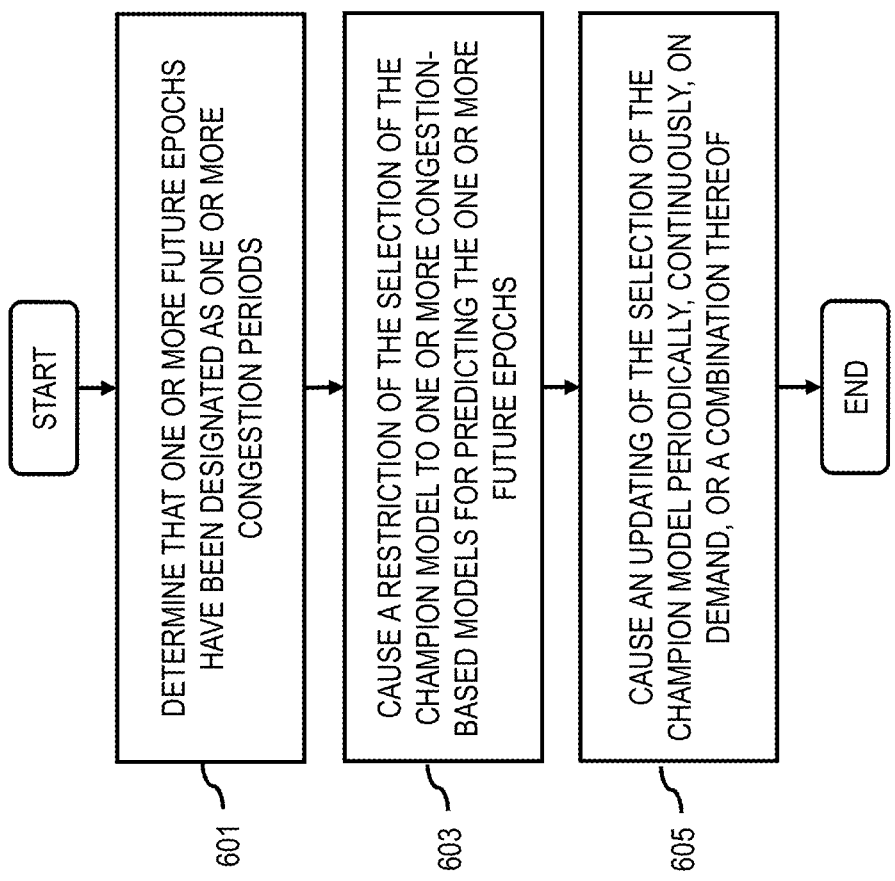
FIG. 6 is a flowchart of a process for causing a reversion of the champion model to the default model over one or more subsequent epochs, and including a transitioning model for the reversion as a means for predicting the traffic information, according to one embodiment.

FIG. 6 is a flowchart of a process for causing a reversion of the champion model to the default model over one or more subsequent epochs, and including a transitioning model for the reversion as a means for predicting the traffic information, according to one embodiment. In one embodiment, the user interface platform performs the process 600 and is implemented in, for instance, a chip set including a processor and a memory as shown in FIG. 11.

In step 601, the user interface platform 109 may determine that one or more future time periods (epochs) have been designated as one or more congestion periods. In one embodiment, the user interface platform 109 may use such designations to ensure reasonable accuracy for high variance congestion periods. In such cases, a choice of a noncongestion model may be accurate for a short period, but result in significant error if used for a prolonged period and during certain times of the day. Thus, in one scenario, the user interface platform 109 may necessitate a restriction in which a selection may be among one or more congestion-based models.

In step 603, the user interface platform 109 may cause a restriction of the selection of the champion model to one or more congestion-based models for predicting the one or more future epochs. In one embodiment, the user interface platform 109 may use the selected model to predict traffic information for the epoch chosen for congestion behavior. In one embodiment, the system 100 may restrict the selection of the champion model to one or more default models for predicting traffic information over the future epochs. In one scenario, this aforementioned restriction is another method of preventing an inadvertent mismatch due to the champion model being chosen from prior epochs, which may be less accurate as the real-time information is processed or as unanticipated events may occur.

In step 605, the user interface platform 109 may cause an updating of the selection of the champion model periodically, continuously, on demand, or a combination thereof. In one embodiment, the user interface platform 109 may update a selection of the at least one champion model—periodically, continuously, on demand, or a combination thereof. In one scenario, the user interface platform 109 may enable a user to process an update via these options (periodically, continuously, on-demand, etc.) to improve performance or conform to user requirements/preferences.

FIG. 7 includes two diagrams (701, 703) for a comparison of historical models utilized in the processes of FIGS. 3-6, according to various embodiments. In one embodiment, the speed for each historical model may be assessed over a time epoch (701). In one scenario, the user interface platform 109 may assess each historical model and compare the confidence metrics over a determined time period (703). In one scenario, during highlighted time range (x-axis), the traffic pattern model is the current champion model since it has a much higher confidence value than the other historical model. In one embodiment, for each real-time point, the calculated confidence may be used to pick the model to decay the real-time speed back to as the predictions go forward in time.

In an example use case for FIG. 7, in one scenario, when two historical models are close to each other, the champion model may switch between them frequently which can lead to unstable predictions. In one embodiment, two conditions suffice to prevent this from happening. In one embodiment, these conditions include: If the previous champion model was the default model, then to replace it the new champion model has to have a confidence 20 greater than the default model to be selected (Ex: Noncongestion Model>Historical Model+20). If the previous champion model was not the default historical model, the default historical model only has to be within 10 of the current champion model to be selected (Ex: Historical Model>Noncongestion Model−10).

Figure 8A:
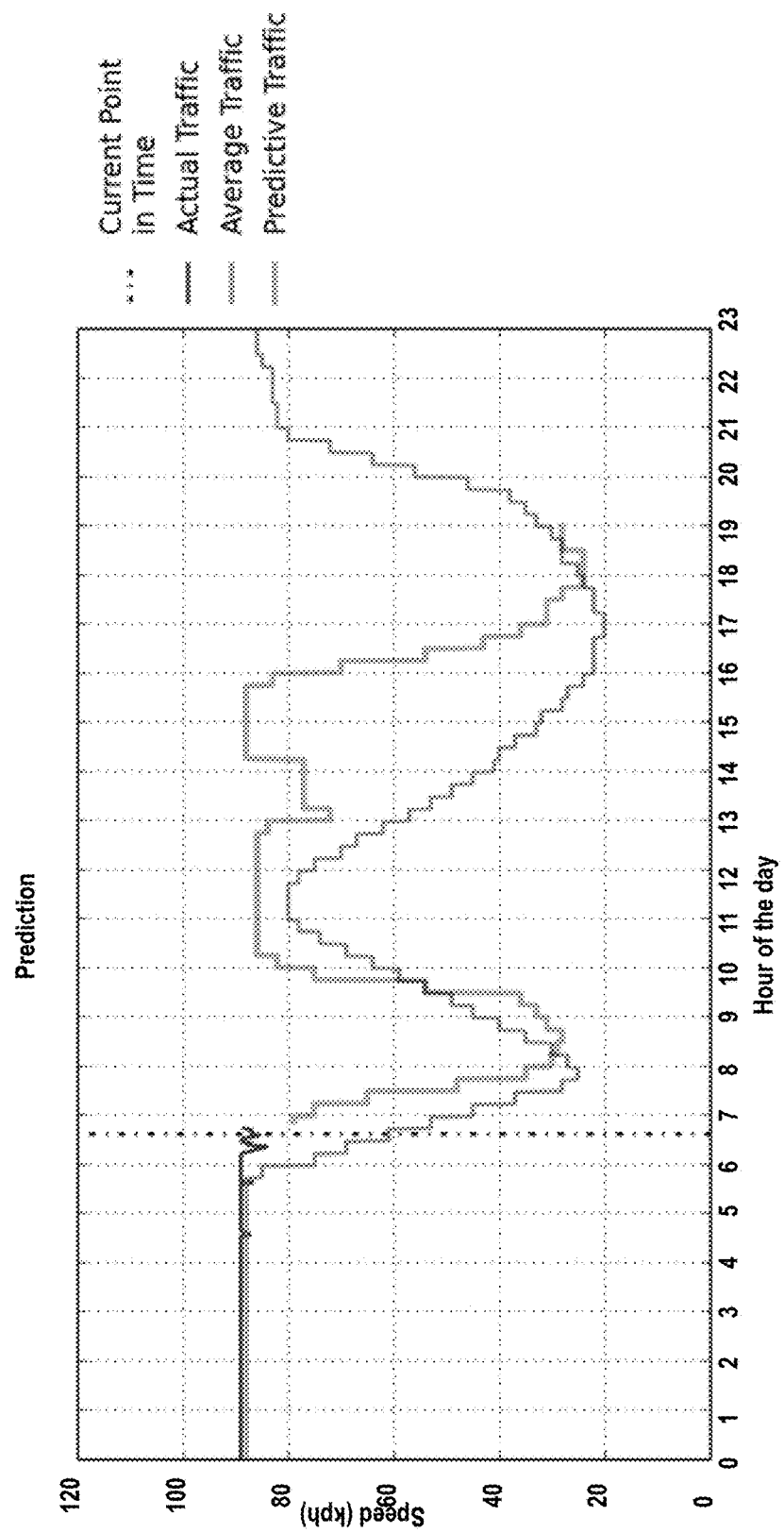
FIGS. 8 A-B are diagrams of use cases for predictive traffic used in the processes of FIGS. 3-6, according to various embodiments.

FIGS. 8 A-B are diagrams of use cases for predictive traffic used in the processes of FIGS. 3-6, according to various embodiments. In one embodiment, the prediction pattern (higher overall line in the two charts) of the first 3 hour's changes significantly after timestamp 06:37:00 AM. In one scenario (FIG. 8A), a model selection algorithm performs according to a standard default model (801) for that day. In another scenario (FIG. 8B), a Model Selection algorithm identifies the noncongestion model (803) as the new champion model, and makes predictions decay to the alternate model for the next two and half hours. As shown in FIG. 8B, the model selection algorithm makes the prediction between 6:00 AM and 9:00 AM more accurate by switching to the noncongestion model as the champion model for that period. This is confirmed by comparison with real data shown in FIG. 9. FIG. 8B additionally include an adjustment for an evening rush hour that may still exist for that day (803). If the champion model was the noncongestion model for too long, there would be large errors for the evening rush hour predictions. Thus, in one scenario, a reversion to the default model prevents such a mistake from happening.

FIG. 9 is a diagram of actual traffic in a real archive to derive traffic statistics for predictive traffic used in the processes of FIGS. 3-6, according to various embodiments. In one embodiment (901), according to real-time data (the highest overall line in the chart), there is no morning rush hour on that day for that road. Thus, in one scenario (FIG. 803), the error of predictions may be improved by avoiding the typical traffic pattern.

The processes described herein for selecting at least one model from plurality of models based, at least in part, on confidence metric for predicting traffic information may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
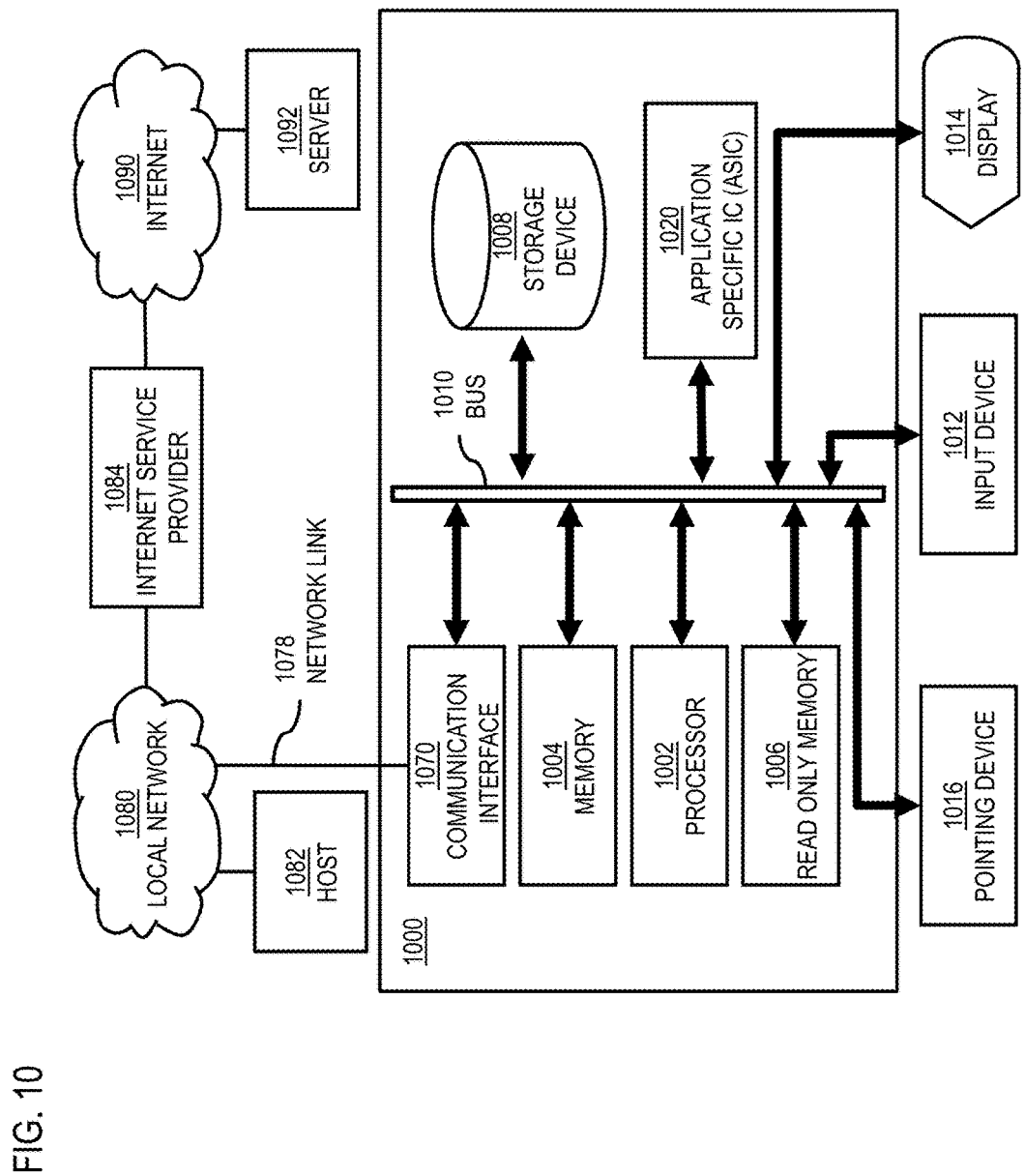
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to select at least one model from plurality of models based, at least in part, on confidence metric for predicting traffic information as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of selecting at least one model from plurality of models based, at least in part, on confidence metric for predicting traffic information.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to selecting at least one model from plurality of models based, at least in part, on confidence metric for predicting traffic information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or any other dynamic storage device, stores information including processor instructions for selecting at least one model from plurality of models based, at least in part, on confidence metric for predicting traffic information. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for selecting at least one model from plurality of models based, at least in part, on confidence metric for predicting traffic information, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 107 for selecting at least one model from plurality of models based, at least in part, on confidence metric for predicting traffic information to the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media.

Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to select at least one model from plurality of models based, at least in part, on confidence metric for predicting traffic information as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of selecting at least one model from plurality of models based, at least in part, on confidence metric for predicting traffic information.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to select at least one model from plurality of models based, at least in part, on confidence metric for predicting traffic information. The memory 1105 also stores the data associated with or generated by the execution of the inventive steps.

Figure 12:
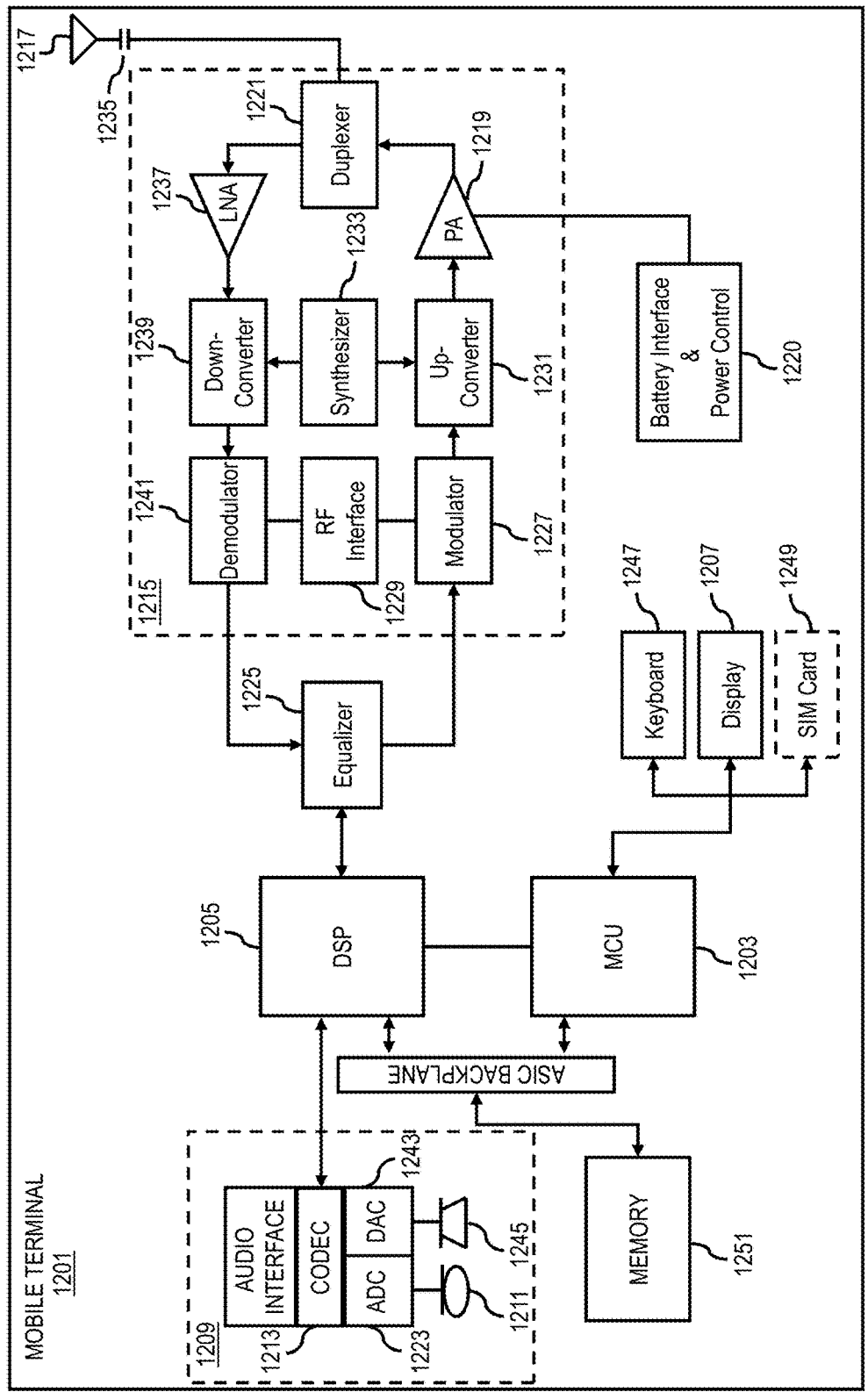
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of selecting at least one model from plurality of models based, at least in part, on confidence metric for predicting traffic information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of selecting at least one model from plurality of models based, at least in part, on confidence metric for predicting traffic information. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to select at least one model from plurality of models based, at least in part, on confidence metric for predicting traffic information. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for automated traffic predictions, comprising:
determining, by an apparatus, a first model and a plurality of unforeseeable event models, wherein the first model and the unforeseeable event models are historical data models for predicting traffic information for one travel segment, wherein each of the unforeseeable event models considers only one type of unforeseeable event that disrupts one or more typical traffic patterns of the day, the type of unforeseeable event is a weather related event, an accident, a road construction, a festival, or a concert, and different types of unforeseeable events have different traffic patterns, and wherein the first model is a default model that uses historical data of typical traffic patterns on the travel segment of a day without considering unforeseeable events that include the types of unforeseeable events considered by the unforeseeable event models;
determining, by the apparatus, a first confidence metric that evaluates the first model against real-time traffic data associated with the travel segment, wherein the real-time traffic data are collected at least by sensors mounted on vehicles travelling on the travel segment, and then performing the following steps:
determining, by the apparatus, a second confidence metric for each of the unforeseeable event models that evaluates the respective unforeseeable event model against the real-time traffic data;
selecting, by the apparatus, one of the unforeseeable event models as a champion model based, at least in part, on that the respective second confidence metric of the champion model is greater than the first confidence metric by a threshold value and is greater than the other one or more second confidence metrics of the other one or more unforeseeable event models, to predict the traffic information for the vehicles travelling on the travel segment;
applying, by the apparatus, the champion model to initiate one or more navigation functions on a user interface; and
reverting, by the apparatus, from the champion model back to the first model, when determining that the second confidence metric of the champion model becomes lower than a threshold for a predetermined time period.

2. A method of claim 1, further comprising:
initiating a prediction of the traffic information for the travel segment by replacing the real-time traffic data with historical traffic data at a decay rate different per travel segment for a predetermined time period.

3. A method of claim 1, further comprising:
preventing the reversion of the champion model to the default model for a period designated for congestion.

4. A method of claim 1, wherein the champion model is reverted by initiating a transition of the champion model to the default model via a gradual transition model for predicting the traffic information, wherein the gradual transition model is a varying-weighted combination of the champion model and the default model.

5. A method of claim 1, further comprising:
determining that one or more future epochs have been designated as one or more congestion periods; and applying a restriction of the selection of the champion model as one or more congestion-based models for predicting the traffic information for the one or more future epochs.

6. A method of claim 1, further comprising:
after determining that the first model and the at least one second model are close to each other, (1) selecting the first model as the champion model when the first confidence metric is greater than the second confidence metric by a first threshold value, and (2) selecting the at least one second model as the champion model, when the second confidence metric is greater than the first confidence metric by a second threshold value that is bigger than the first threshold value.

7. A method of claim 1, further comprising:
updating the selection of the champion model periodically, continuously, on demand, or a combination thereof.

8. An apparatus for automated traffic predictions, comprising:
at least one processor; and
at least one memory including computer program code for one or more programs,
the at least one memory and the computer program code configured to, with the at least one processor, cause the apparatus to perform at least the following,
determine a first model and a plurality of unforeseeable event models, wherein the first model and the unforeseeable event models are historical data models for predicting traffic information for one travel segment, wherein each of the unforeseeable event models considers only one type of unforeseeable event that disrupts one or more typical traffic patterns of the day, the type of unforeseeable event is a weather related event, an accident, a road construction, a festival, or a concert, and different types of unforeseeable events have different traffic patterns, and wherein the first model is a default model that uses historical data of typical traffic patterns on the travel segment of a day without considering unforeseeable events that include the types of unforeseeable events considered by the unforeseeable event models;
determine a first confidence metric that evaluates the first model against real-time traffic data associated with the travel segment, wherein the real-time traffic data are collected at least by sensors mounted on vehicles travelling on the travel segment, and then performing the following:
determine a second confidence metric for each of the unforeseeable event models that evaluates the respective unforeseeable event model against the real-time traffic data;
select one of the unforeseeable event models as a champion model based, at least in part, on that the respective second confidence metric of the champion model is greater than the first confidence metric by a threshold value and is greater than the other one or more second confidence metrics of the other one or more unforeseeable event models, to predict the traffic information for the vehicles travelling on the travel segment;
apply the champion model to initiate one or more navigation functions on a user interface; and
revert from the champion model back to the first model, when determining that the second confidence metric of the champion model becomes lower than a threshold for a predetermined time period.

9. An apparatus of claim 8, wherein the apparatus is further caused to:
prevent the reversion of the champion model to the default model for a period designated for congestion.

10. An apparatus of claim 8, wherein the apparatus is further caused to:
initiate a prediction of the traffic information for the travel segment by replacing the real-time traffic data with historical traffic data at a decay rate different per travel segment for a predetermined time period.

11. An apparatus of claim 8, wherein the champion model is reverted by initiating a transition of the champion model to the default model via a gradual transition model for predicting the traffic information, wherein the gradual transition model is a varying-weighted combination of the champion model and the default model.

12. A non-transitory computer-readable storage medium carrying one or more sequences of one or more instructions which, when executed by one or more processors, cause an apparatus for automated traffic predictions to at least perform the following steps:
determining a first model and a plurality of unforeseeable event models, wherein the first model and the unforeseeable event models are historical data models for predicting traffic information for one travel segment, wherein each of the unforeseeable event models considers only one type of unforeseeable event that disrupts one or more typical traffic patterns of the day, the type of unforeseeable event is a weather related event, an accident, a road construction, a festival, or a concert, and different types of unforeseeable events have different traffic patterns, and wherein the first model is a default model that uses historical data of typical traffic patterns on the travel segment of a day without considering unforeseeable events that include the types of unforeseeable events considered by the unforeseeable event models;
determining a first confidence metric that evaluates the first model against real-time traffic data associated with the travel segment, wherein the real-time traffic data are collected at least by sensors mounted on vehicles travelling on the travel segment, and then performing the following steps:
determining a second confidence metric for each of the unforeseeable event models that evaluates the respective unforeseeable event model against the real-time traffic data;
selecting one of the unforeseeable event models as a champion model based, at least in part, on that the respective second confidence metric of the champion model is greater than the first confidence metric by a threshold value and is greater than the other one or more second confidence metrics of the other one or more unforeseeable event models, to predict the traffic information for the vehicles travelling on the travel segment;
applying the champion model to initiate one or more navigation functions on a user interface; and
reverting from the champion model back to the first model, when determining that the second confidence metric of the champion model becomes lower than a threshold for a predetermined time period.

13. A non-transitory computer-readable storage medium of claim 12, wherein the apparatus is caused to further perform:
initiating a prediction of the traffic information for the travel segment by replacing the real-time traffic data with historical traffic data at a decay rate different per travel segment for a predetermined time period.

* * * * *